(12) United States Patent
Wengelnik et al.

(10) Patent No.: US 9,804,744 B2
(45) Date of Patent: Oct. 31, 2017

(54) METHOD FOR OPERATING A CONTROL DEVICE IN A VEHICLE

(71) Applicant: VOLKSWAGEN AKTIENGESELLSCHAFT, Wolfsburg (DE)

(72) Inventors: Heino Wengelnik, Wolfsburg (DE); Holger Wild, Berlin (DE)

(73) Assignee: Volkswagen AG (DE)

( * ) Notice: Subject to any disclaimer, the term of this patent is extended or adjusted under 35 U.S.C. 154(b) by 283 days.

(21) Appl. No.: 14/758,571

(22) PCT Filed: Dec. 16, 2013

(86) PCT No.: PCT/EP2013/076692
§ 371 (c)(1),
(2) Date: Jun. 30, 2015

(87) PCT Pub. No.: WO2014/106571
PCT Pub. Date: Jul. 10, 2014

(65) Prior Publication Data
US 2015/0363056 A1    Dec. 17, 2015

(30) Foreign Application Priority Data

Jan. 4, 2013   (DE) .................. 10 2013 000 221
Apr. 27, 2013  (DE) .................. 10 2013 007 329

(51) Int. Cl.
G06F 13/00    (2006.01)
G06F 15/00    (2006.01)
(Continued)

(52) U.S. Cl.
CPC ............ G06F 3/0482 (2013.01); G06F 3/017 (2013.01); G06F 3/0416 (2013.01);
(Continued)

(58) Field of Classification Search
CPC .................. G01C 21/26; G01S 19/07
(Continued)

(56) References Cited

U.S. PATENT DOCUMENTS 7,729,859 B2 *   6/2010   Kimura .............. B60K 26/021
                                                340/435
8,013,837 B1 *   9/2011   Schroeder ............ G06F 3/011
                                                345/157
(Continued)

FOREIGN PATENT DOCUMENTS

DE         10326215 A1    12/2004
DE    102005048840 A1     4/2007
(Continued)

OTHER PUBLICATIONS

International Preliminary Report on Patentability for International Patent Application No. PCT/EP2013/076692; dated Jul. 16, 2015.
(Continued)

*Primary Examiner* — Kevin Nguyen
(74) *Attorney, Agent, or Firm* — Barnes & Thornburg LLP

(57) ABSTRACT

A method for operating a control device in a vehicle, wherein the control device includes a control element having a user interface. In the method, menus are simultaneously displayed on a display surface. Furthermore, a detection region is formed, which is divided into detection zones, wherein each detection zone is associated with a respective menu. The position of an actuation object in the detection region is detected and associated with a detection zone. The menu that is associated with the detection zone in which the actuation object was detected is enlarged and the menus that are associated with the other detection zones are reduced in size. Also disclosed is a control device in a vehicle.

10 Claims, 5 Drawing Sheets

(51) Int. Cl.
   *G06F 3/0482*   (2013.01)
   *G06F 3/0488*   (2013.01)
   *G06F 3/01*     (2006.01)
   *G06F 3/041*    (2006.01)

(52) U.S. Cl.
   CPC ...... *G06F 3/04883* (2013.01); *G06F 3/04886* (2013.01); *B60K 2350/1012* (2013.01); *G06F 2203/04108* (2013.01)

(58) Field of Classification Search
   USPC .......................... 715/762–765; 701/117–119
   See application file for complete search history.

(56)            References Cited

U.S. PATENT DOCUMENTS

2010/0090964 A1    4/2010  Soo et al.
2014/0303890 A1*  10/2014  Jun ................... B60K 37/06
                                               701/532

FOREIGN PATENT DOCUMENTS

| DE | 102006037156 A1 | 9/2007 |
| DE | 102008046764 A1 | 3/2010 |
| DE | 102009036369 A1 | 2/2011 |
| KR | 20110062062 A   | 6/2011 |
| WO | 2011051361 A1   | 5/2011 |

OTHER PUBLICATIONS

Search Report for International Patent Application No. PCT/EP2013/076692; dated Mar. 27, 2014.

\* cited by examiner

METHOD FOR OPERATING A CONTROL DEVICE IN A VEHICLE

PRIORITY CLAIM

This patent application is a U.S. National Phase of International Patent Application No. PCT/EP2013/076692, filed 16 Dec. 2013, which claims priority to German Patent Application Nos. 10 2013 000 221.4, filed 4 Jan. 2013, and 10 2013 007 329.4, filed 27 Apr. 2013, the disclosures of which are incorporated herein by reference in their entirety.

SUMMARY

Illustrative embodiments relate to a method for operating an operating device in a vehicle, the operating device comprising an operating element having a user interface. Illustrative embodiments also relate to an operating device in a vehicle.

Disclosed embodiments provide a method and an operating device, in the case of which intuitive and simple menu guidance in a vehicle by the user is ensured.

BRIEF DESCRIPTION OF THE DRAWINGS

Disclosed embodiments are now explained with reference to the drawings.

DETAILED DESCRIPTION OF THE DISCLOSED EMBODIMENTS

Figure 1:
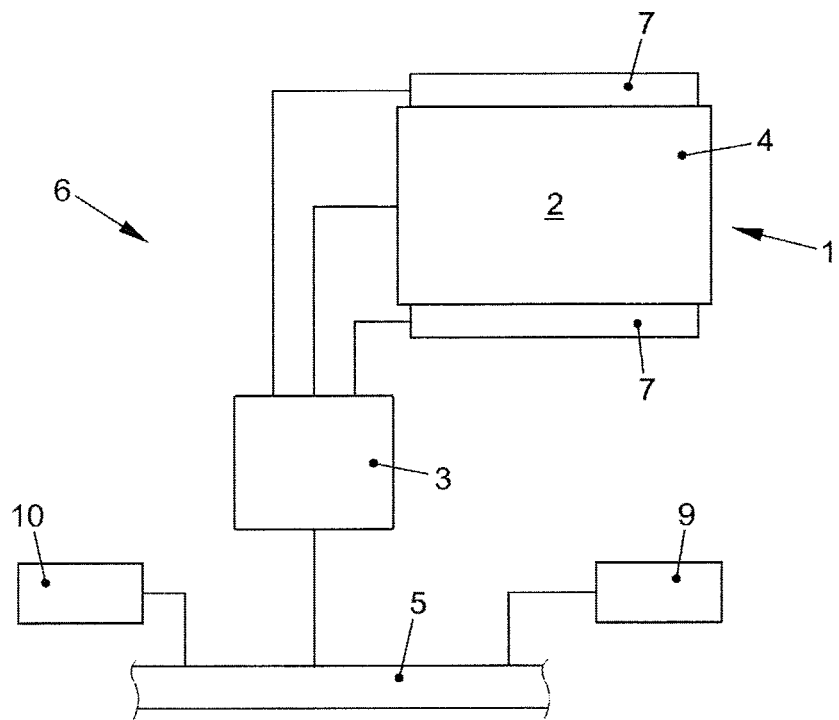
FIG. 1 schematically shows an exemplary embodiment of the operating device.

In the disclosed method, a plurality of menus are displayed at the same time on a display surface. In this case, a detection region is formed in front of the display surface and is divided into a plurality of detection zones, each detection zone being assigned to a menu. The position of an actuation object is detected in the detection region and is assigned to a detection zone. The menu which is assigned to the one detection zone in which the actuation object has been detected is then displayed on an enlarged scale. The menus which are assigned to the other detection zones are displayed on a reduced scale. The disclosed method allows the user to simultaneously gain an overview of a plurality of menus at any time without constantly having to switch back and forth between different displays. At the same time, the enlarged display of the menu for the one detection zone simplifies the operation of this menu. This advantageously increases safety when driving the vehicle since the menus are operated intuitively and quickly.

The actuation object may be any desired element which can be used to actuate the user interface. The actuation object is, in particular, the hand or fingertip of a user. In particular, the hand or fingertip of the user is detected in the detection region before the fingertip touches the user interface of the operating element.

In the disclosed method, a position of the actuation object can be detected by virtue of the arrangement of the detection zones. In this case, the number of detection zones may correspond to the number of menus. Precisely one detection zone is assigned to each menu. This ensures clear menu guidance.

The detection zones adjoin one another, in particular, in such a manner that, if the actuation object moves in a direction parallel to the user interface, the actuation object immediately changes from one detection zone to an adjoining detection zone. The actuation element immediately changes from one detection zone to an adjoining detection zone, in particular, when it is moved from one side to the other in front of the operating surface.

The detection region comprises, in particular, a volume in front of the user interface. The detection zones then extend away from the user interface in a perpendicular manner, in particular. In this case, the detection zones are not changed when the actuation element moves perpendicular to the user interface. The detection zones are changed only when the movement has a component parallel to the user interface.

According to at least one disclosed embodiment of the method, the entire display surface is occupied by the menus, with the result that the menus which are assigned to another detection zone in which the actuation object has not been detected are displayed on a reduced scale according to the enlargement of the one detection zone. The overview of a plurality of menus is thus advantageously retained. The user need not switch back and forth between different displays.

In particular, three menus are displayed at the same time. The number of displayed menus is generally arbitrary. However, the number of displayed menus should not be so high that the display on the display surface becomes unclear. The number of menus displayed at the same time may be between two and five.

According to another disclosed embodiment, the menus extend horizontally over the width of the display surface, with the result that the detection region is divided into a plurality of horizontal detection zones. Alternatively, the menus can also extend vertically over the height of the display surface. The detection region is then divided into a plurality of vertical detection zones. The user can then advantageously choose the direction of movement of the actuation object.

According to another disclosed embodiment, it is determined which menus are used most frequently by a user. These menus are then selected for display at the same time. This is a particularly user-friendly refinement of the disclosed embodiment. From the outset, the user finds the menus most frequently used by him on the display surface. Alternatively, the displayed menus can also be selected in another manner. They may be selected by the user, for example, using menu lists, menu grids, menu buttons, menu carousels or menu ribbons. However, the menus can also be selected using voice operation.

The disclosed operating device in a vehicle comprises an operating element which has a user interface. The operating device also comprises a display device having a display surface on which a plurality of menus can be displayed at the same time, and an approach detection device. The approach detection device can be used to detect an actuation object in a detection region, the detection region being divided into a plurality of detection zones and each detection zone being assigned to a menu. The operating device also comprises a control device which controls the display surface in such a manner that the menu which is assigned to the one detection zone in which the actuation object has been detected is displayed on an enlarged scale. The menus which are assigned to the other detection zones are displayed on a reduced scale. The operating device is designed, in particular, to carry out the disclosed method.

The user interface may be touch-sensitive and is arranged on the display surface.

Disclosed embodiments also relate to a vehicle having such an operating device.

Figure 2:
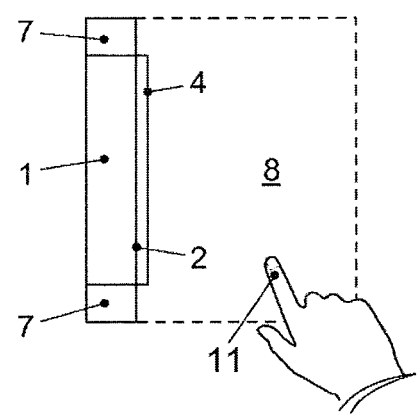
FIG. 2 shows a sectional view of the display device in the exemplary embodiment of the operating device.
Figure 5:
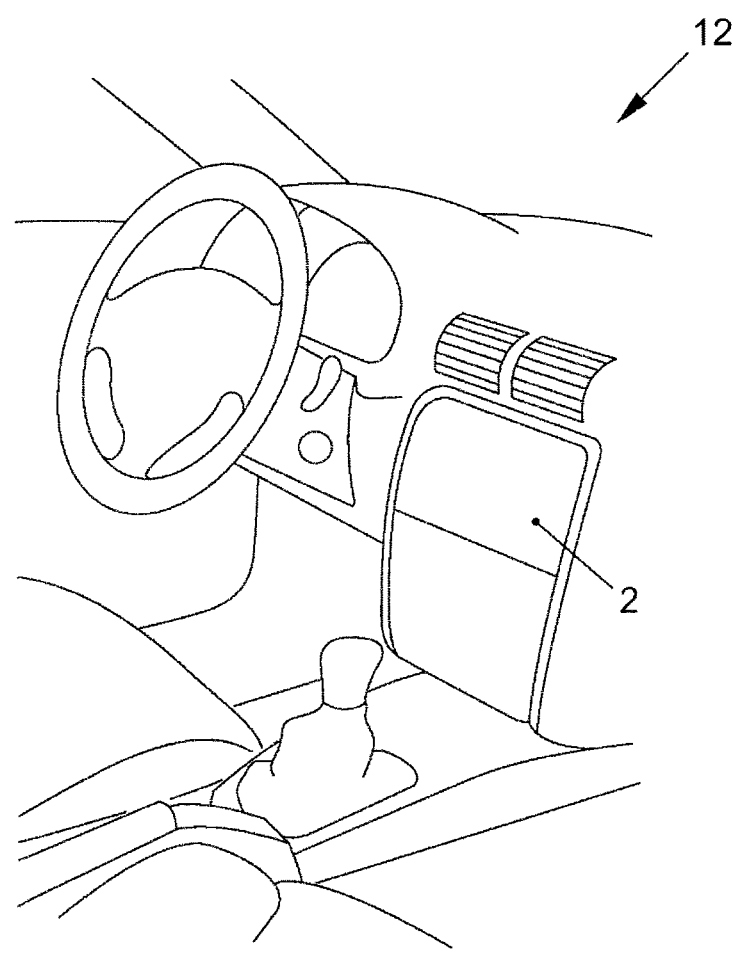
FIG. 5 shows a perspective view of the operating device in a vehicle.

An exemplary embodiment of the operating device 6 and its arrangement in a vehicle 12 are first of all explained with reference to FIGS. 1, 2 and 5:

The operating device 6 comprises an operating element having a user interface 4. In the exemplary embodiment described here, the user interface 4 is touch-sensitive and is arranged on the display surface 2 of a display device 1. A so-called touchscreen is therefore provided. The display surface 2 having the touch-sensitive user interface 4 is arranged centrally in the front region of the vehicle 12 between the driver's seat and the passenger seat, with the result that the display surface 2 can be viewed well both by the driver and by the passenger and can be reached using the fingertip 11. The user interface 4 can therefore be actuated by the driver or passenger using an actuation object 11. The actuation object 11 can be used to actuate the user interface 4 of the operating element, which user interface is a touchscreen.

The operating device 6 also comprises a control device 3. The control device 3 is connected to the display device 1 which can be used to generate a plurality of menus A, B and C for menu guidance on the display surface 2.

The operating device 6 also comprises an approach detection device 7. The approach detection device 7 can be used to detect an actuation object 11 in a detection region 8. The detection region 8 is illustrated in detail in FIG. 2. The detection region 8 is designed in such a manner that the situation in which an actuation object 11 approaches the touch-sensitive surface 4 is detected by the approach detection device 7 on the display surface 2.

In the exemplary embodiment described here, the detection region 8 forms at least a volume in front of the user interface 4. A cuboid, in particular, is formed, the side surfaces of which completely surround the touch-sensitive surface 4 in the extent which runs parallel to the touch-sensitive surface 4. In a direction perpendicular to the touch-sensitive surface 4, the cuboid extends to a distance of approximately 40 cm, for example, from the touch-sensitive surface 4 or directly in front of the touch-sensitive surface 4. In this case, the distance of the outer boundary of the detection region 8 in front of the touch-sensitive surface 4 is selected in such a manner that the situation in which the touch-sensitive surface 4 is approached can be detected in good time such that the display on the display surface 2 can be changed early enough to assist the user during an input. Furthermore, the distance between the detection region 8 and the touch-sensitive surface 4 should be selected in such a manner that the actuation object 11 or another object is moved into the detection region 8 as rarely as possible if no operation of the touch-sensitive surface 4 is intended.

Further details of different embodiments of the approach detection device 7 are described in WO 2011/051361 A1, for example.

Figure 3:
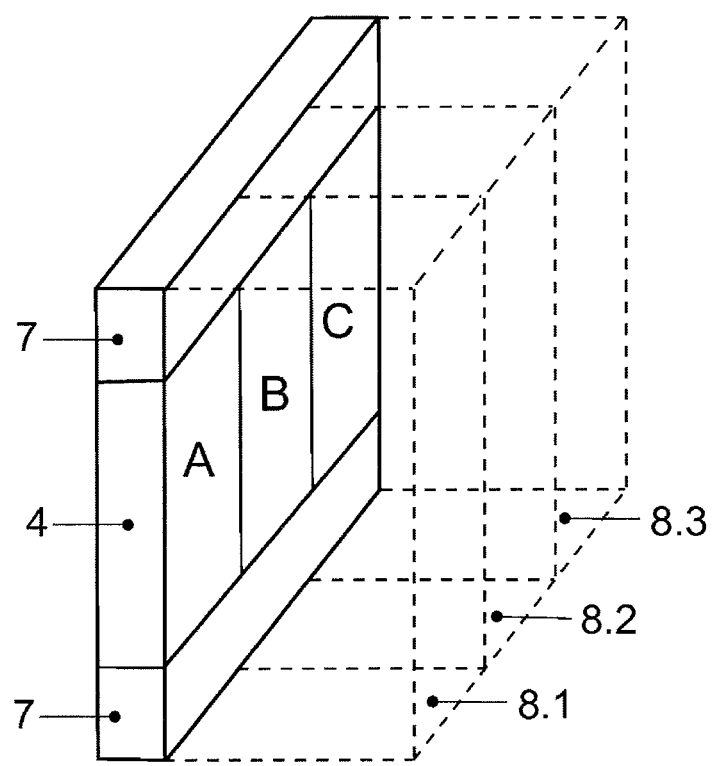
FIG. 3 shows a perspective view of the geometry of the detection region.

In the exemplary embodiment described here, three menus A, B, C are intended to be displayed on the display surface 2. The division of the detection region 8 into detection zones 8.1 to 8.3 is shown in detail in FIG. 3. Each detection zone 8.1 to 8.3 in turn forms a cuboid. The top side and underside of the cuboid for one detection zone 8.1 to 8.3 coincide with the top side and underside of the cuboid of the detection region 8. Similarly, the surfaces which face or face away from the user interface 4 form the corresponding surfaces of the cuboid for the detection region 8. The cuboid of the detection region 8 is therefore vertically divided by the cuboids of the detection zones 8.1 to 8.3. The detection zones 8.1 to 8.3 extend away from the user interface 4 in a perpendicular manner. Each detection zone is assigned to a menu displayed on the display surface. Detection zone 8.1 is assigned to the menu A, detection zone 8.2 is assigned to the menu B and detection zone 8.3 is assigned to the menu C. The number of detection zones depends on the number of menus. If four or five menus are therefore displayed, the detection region 8 is divided into four or five detection zones. This makes it possible to clearly assign the detection zones to the menus.

The approach detection device 7 continuously transmits the current position of an actuation object 11 in the detection region 8 to the control device 3. Depending on this signal, the control device 3 can assign the position of the actuation object 11 to a detection zone 8.1 to 8.3 and can change the display on the display surface 2.

Finally, the control device 3 is coupled to a data bus 5. This data bus 5 is used to connect the control device 3 to further devices 9, 10 in the vehicle 12, with respect to which information is intended to be displayed on the display surface 2 and which are intended to be operated using the operating device 6. Information can be displayed to the vehicle occupants using the operating device 6 and by means of the method. The vehicle occupants can also operate devices 9, 10 in the vehicle 12 using the operating device 6 and can control the display.

Figure 4A:
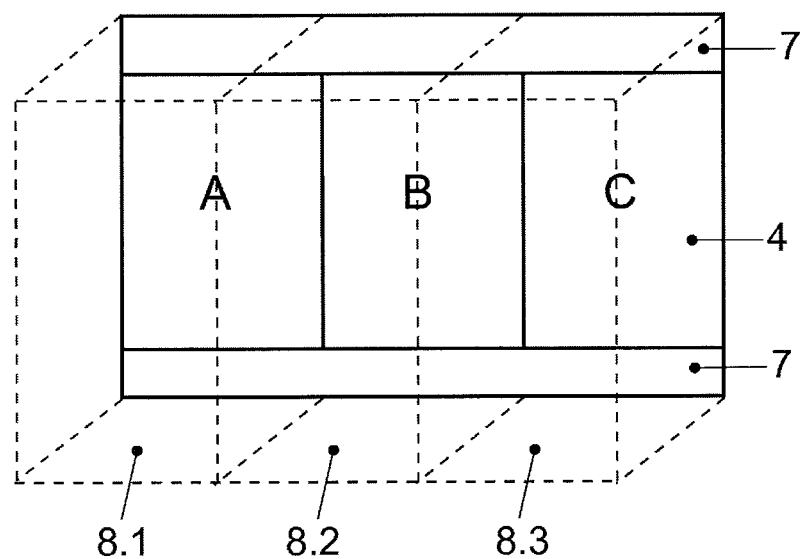
FIG. 4a shows the geometry of the detection region and the view of the display surface in a front view.

At least one exemplary embodiment of the method, which can be carried out by the operating device 6 described above, is explained in detail below with reference to FIGS. 4a to 4d:

FIG. 4a shows a front view of the display on the display surface 2 on which three menus A, B, C are displayed horizontally beside one another if no actuation object has been detected by the approach detection device 7. The menus A, B, C occupy the entire display surface 2 and each extend over the height of the display surface 2.

The displayed menus A, B and C can be selected in different ways. The displayed menus A, B and C may be selected, for example, from a menu list, a menu grid, a menu carousel or a menu ribbon. Alternatively, the menus can also be selected using voice operation. However, the menus which are used most frequently by the user may always be displayed.

The menus are displayed with the same size. Although an overview of the content of the menus is possible in this view, actuation is possible only with difficulty on account of the restricted size of each menu. Such difficulties during operation are intended to be avoided in the disclosed operating device and the disclosed method.

In a first step, a detection zone 8.1, 8.2 and 8.3 is assigned to each menu A, B and C. More specifically, the detection zone 8.1 is assigned to the menu A, the detection zone 8.2 is assigned to the menu B and the detection zone 8.3 is assigned to the menu C.

Figure 4B:
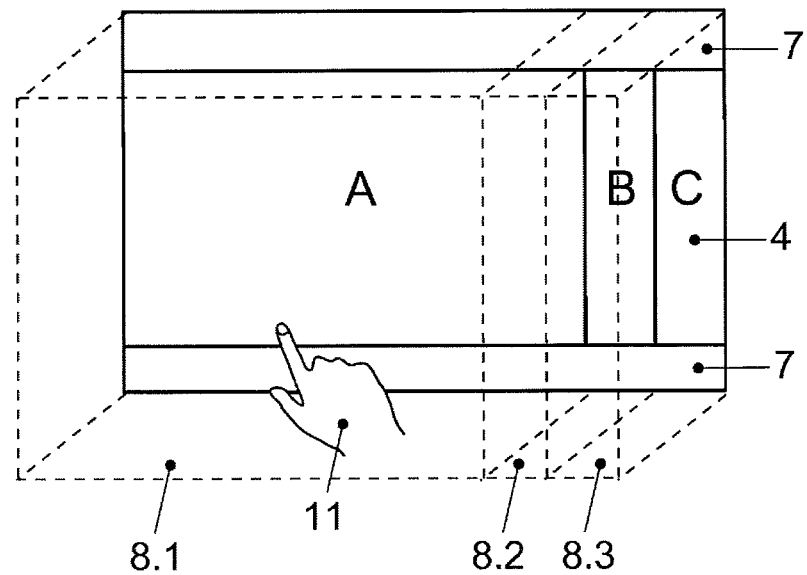
FIG. 4b-4d show an exemplary embodiment of the display on a display surface with an actuation object detected in the different detection zones.

In a second step, the situation in which an actuation object 11, a fingertip 11 of the driver or passenger in the specific exemplary embodiment, approaches the user interface 4 is detected by the approach detection device 7. If, as shown in FIG. 4b, the fingertip 11 is detected in the detection zone 8.1 assigned to the menu A, the control device 3 controls the display device 1 in such a manner that the menu A is displayed on an enlarged scale on the display surface 2. At the same time, menus B and C are shifted in the direction of the right-hand edge of the display surface 2 and are accordingly displayed on a reduced scale. To avoid the menus B and C being enlarged during operation of the menu A, the detection zones 8.2 and 8.3 are reduced to the same extent as the menus B and C assigned to them. In particular, all three menus A, B and C are visible at any time on the display surface 2. The three menus A, B and C may occupy the entire display surface 2.

Figure 4C:
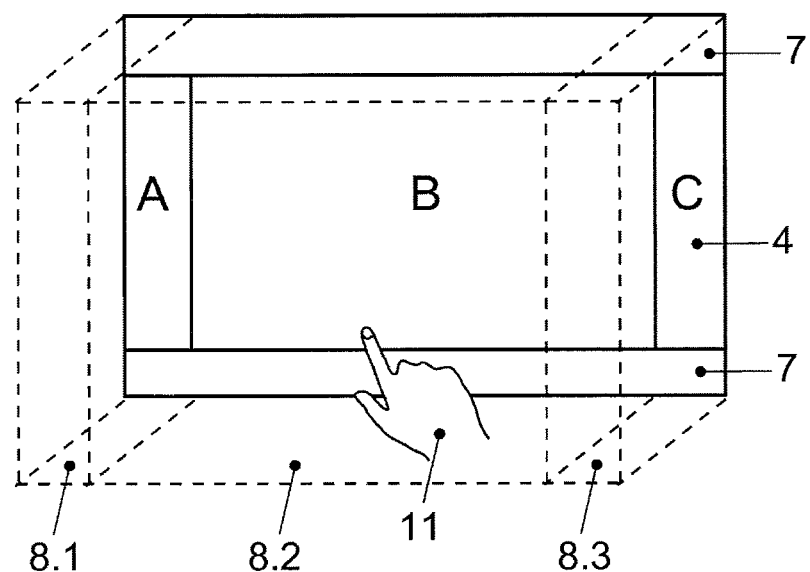

To operate the menu B, the user moves his fingertip 11 in front of the menu B, that is to say into the detection zone 8.2. The fingertip 11 is detected by the approach detection device 7 in the detection zone 8.2. The control device 3 therefore controls the display device 1 in such a manner that the menu B, which is situated in the center between menu A and menu C, is displayed on an enlarged scale. Menu A is simultaneously shifted to the left-hand edge of the display surface 2 and menu C is shifted to the right-hand edge of the display surface 2 and are displayed there on a reduced scale. The detection zones 8.1 and 8.3 are reduced to the same extent as the menus A and C. This is shown in FIG. 4c.

Figure 4D:
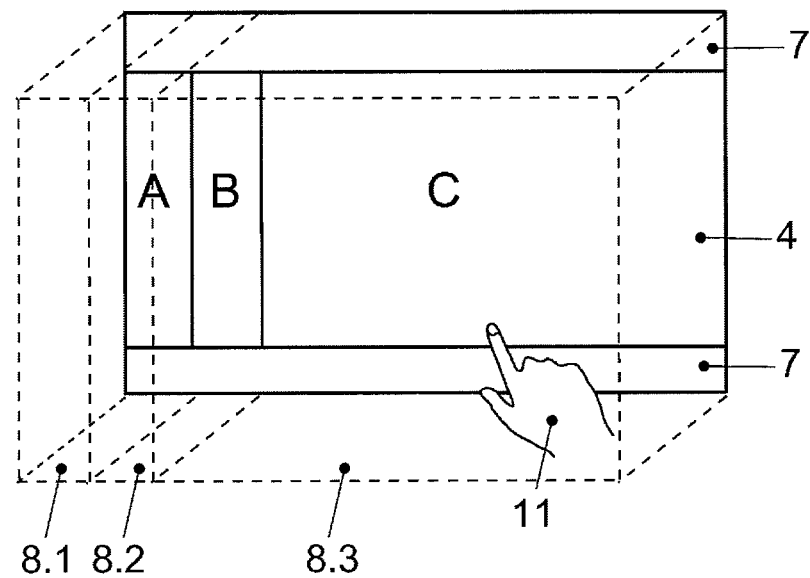

To operate the menu C, the fingertip 11 is detected in the detection zone 8.3 by the approach detection device 7. The control device 3 therefore controls the display device 1 in such a manner that the menu C is displayed on an enlarged scale on the display surface 2, while the menus A and B are shifted in the direction of the left-hand edge of the display surface 2 and are displayed there on a reduced scale. The detection zones 8.1 and 8.2 are reduced to the same extent as the menus A and B. This is shown in FIG. 4d.

As an alternative to horizontally arranging the menus A, B and C, the menus A, B and C may also be arranged vertically below one another. The detection zones 8.1, 8.2 and 8.3 are then cuboids in front of the menus. If the fingertip 11 is then detected in detection zone 8.1, menu A is displayed on an enlarged scale, while the menus B and C are displayed at the lower edge of the display surface 2. If the menu B is displayed on an enlarged scale, the menu A is displayed on a reduced scale at the upper edge and the menu C is displayed on a reduced scale at the lower edge of the display surface 2. If the menu C is displayed on an enlarged scale, the menus A and B are likewise displayed on a reduced scale at the upper edge of the display surface 2.

The menus may naturally also be arranged in a plurality of rows and columns. This therefore corresponds to a combination of the horizontal and vertical arrangement of the menus.

A vehicle, in particular a motor vehicle, contains a multiplicity of electronic devices, the operation of which must be enabled for the driver or another vehicle occupant. These devices include, for example, a navigation system, a multiplicity of driver assistance systems and communication and multimedia applications which comprise, for example, a telephone system and devices for playing back music and voice such as a radio or a CD player.

To be able to operate the various devices in the vehicle, central multifunction operating systems are often used in vehicles and comprise one or more multifunction displays and operating elements which can be used to operate the devices contained in the vehicle. In this case, operation is assisted or guided by the information represented on the multifunction display. Furthermore, the operating system can be used to select which information is intended to be displayed on the multifunction display.

U.S. Pat. No. 8,013,837 B1 describes a method in which a text input or an input of control characters the control of operating devices is simplified by means of a point-and-click gesture.

DE 103 26 215 A1 describes an operating device in which the situation in which a finger approaches a button, for example, suffices to display a preview of the function of the button. The function is then activated by pressing the button.

Very specific requirements result for operating the various devices in a vehicle since the operation can be carried out, inter alia, by the driver. It is very important that the operating process and the associated information intake do not result in the driver being distracted during the journey. The operating process should therefore require as little attention from the driver as possible and should also be able to be quickly carried out.

To simplify the operation of a touch-sensitive surface of a touchscreen, DE 10 2006 037 154 A1 and DE 10 2006 037 156 A1 have proposed the practice of detecting the position of an actuation element before it touches the touch-sensitive surface. For example, the approach of a user's finger is interpreted as an operating intention. If such an operating intention is determined, the information displayed on the display surface may be changed in such a manner that the touchscreen can be operated more easily. If an operating intention is detected, buttons, in particular, are displayed on an enlarged scale, with the result that they can be more easily struck by the user.

However, sometimes a user would like to frequently change between different menus. Since only one menu is generally displayed, however, intuitive and fast menu guidance is often not ensured since the user must switch back and forth between the individual menus.

LIST OF REFERENCE SYMBOLS

1 Display device
2 Display surface
3 Control device
4 User interface
5 Data bus
6 Operating device
7 Approach detection device
8 Detection region
8.1-8.3 Detection zones
9 Device in the vehicle
10 Device in the vehicle
11 Actuation object, fingertip
12 Vehicle

The invention claimed is:

1. A method for operating an operating device in a vehicle, the operating device comprising an operating element having a user interface, wherein
　a plurality of menus are displayed at the same time on a display surface;
　a detection region is formed and is divided into a plurality of detection zones, each detection zone is assigned to a menu;
　the position of an actuation object is detected in the detection region and is assigned to a detection zone; and
　the menu which is assigned to the one detection zone in which the actuation object has been detected is displayed on an enlarged scale, and the menus which are assigned to the other detection zones are displayed on a reduced scale.

2. The method of claim 1, wherein the entire display surface is occupied by the menus, with the result that the menus which are assigned to another detection zone in which the actuation object has not been detected are displayed on a reduced scale according to the enlargement of the one detection zone.

3. The method of claim 1, wherein the detection region comprises a volume in front of the user interface.

4. The method of claim 1, wherein three menus are displayed at the same time.

5. The method of claim 1, wherein the menus extend horizontally over the width of the display surface, whereby the detection region is divided into a plurality of horizontal detection zones.

6. The method of claim 1, wherein the menus extend vertically over the height of the display surface, whereby the detection region is divided into a plurality of vertical detection zones.

7. The method of claim 1, wherein it is determined which menus are used most frequently, and these menus are selected for display at the same time.

8. An operating device in a vehicle, the operating device comprising:
- an operating element which has a user interface;
- a display device having a display surface on which a plurality of menus can be displayed at the same time;
- an approach detection device which can be used to detect an actuation object in a detection region, the detection region is divided into a plurality of detection zones and each detection zone is assigned to a menu; and
- a control device which controls the display surface such that the menu which is assigned to the one detection zone in which the actuation object has been detected is displayed on an enlarged scale, and the menus which are assigned to the other detection zones are displayed on a reduced scale.

9. The operating device of claim 8, wherein the user interface is touch-sensitive and is arranged on the display surface.

10. A vehicle having an operating device, the operating device comprising:
- an operating element which has a user interface;
- a display device having a display surface on which a plurality of menus can be displayed at the same time;
- an approach detection device which can be used to detect an actuation object in a detection region, the detection region is divided into a plurality of detection zones and each detection zone is assigned to a menu; and
- a control device which controls the display surface such that the menu which is assigned to the one detection zone in which the actuation object has been detected is displayed on an enlarged scale, and the menus which are assigned to the other detection zones are displayed on a reduced scale.

* * * * *